(12) United States Patent  (10) Patent No.: US 8,068,036 B2
Ghazarian  (45) Date of Patent: Nov. 29, 2011

(54) INTERSECTION VEHICLE COLLISION AVOIDANCE SYSTEM

(76) Inventor: Ohanes Ghazarian, Henderson, NV (US)

( * ) Notice: Subject to any disclaimer, the term of this patent is extended or adjusted under 35 U.S.C. 154(b) by 215 days.

(21) Appl. No.: 12/586,016

(22) Filed: Sep. 15, 2009

(65) Prior Publication Data

US 2010/0073194 A1    Mar. 25, 2010

(51) Int. Cl.
*G08G 1/16* (2006.01)
(52) U.S. Cl. ....................................................... 340/903
(58) Field of Classification Search .................. 340/903, 340/907, 901, 919, 931, 933, 936, 426.19
See application file for complete search history.

(56) References Cited

U.S. PATENT DOCUMENTS

| | | | | |
|---|---|---|---|---|
| 5,635,920 A | * | 6/1997 | Pogue et al. | 340/901 |
| 5,940,010 A | * | 8/1999 | Sasaki et al. | 340/901 |
| 5,952,941 A | * | 9/1999 | Mardirossian | 340/936 |
| 6,166,658 A | * | 12/2000 | Testa | 701/93 |
| 6,370,475 B1 | * | 4/2002 | Breed et al. | 701/301 |
| 6,516,273 B1 | * | 2/2003 | Pierowicz et al. | 701/301 |
| 6,617,981 B2 | * | 9/2003 | Basinger | 340/909 |
| 6,807,464 B2 | * | 10/2004 | Yu et al. | 701/1 |

* cited by examiner

*Primary Examiner* — Phung Nguyen

(57) ABSTRACT

The present invention discloses a system that alerts the operator of a vehicle, when operator is not in compliance with an intersection signal condition, where the intersection traffic signal conditions does not permit driver of vehicles to cross the intersection. The system comprises of traffic light or stop sign RF transmitter or transceiver units, and plurality of vehicles equipped with vehicle collision avoidance device containing RF transceivers to receive signals from the intersection signal transmitter units, the vehicle collision avoidance device is equipped with vehicle speed comparator CPU and vehicle travel direction sensing circuitry using a compass or GPS receiver to determine vehicle travel direction and monitor vehicle speed. A beeper, LED or vibrator is incorporated for warning the driver.

7 Claims, 3 Drawing Sheets

INTERSECTION VEHICLE COLLISION AVOIDANCE SYSTEM

BACKGROUND OF INVENTION

Vehicles, such as passenger cars, trucks, buses generally have the need to cross or pass intersections under the control of traffic signals or signs.

Since the earliest times; the driver of motor vehicles depend on such signals, and the decision to pass a motor vehicle an intersection was solely depended on traffic signals and vehicle driver, based on driver vision, alertness, awareness, judgment etc. This has not always proven to be successful, in the past and present vehicles involve in intersection accidents are among the highest compare to vehicle accidents reports on the roads and highways, due to driver confusion, impaired, inattention, or overly aggressive driver attitude, and speed.

There have been many systems proposed to address problems of ability to warn drivers of presence of emergency vehicle at an intersection, or ability of an emergency vehicle to control traffic light, or controlling traffic light by satellite. One such system is disclosed in;

U.S. Pat. No. 5,926,113 to Jones et al. Where at a traffic signal preemption system, including a vehicle mount GPS receiver, for transmitting its GPS measurements by radio to a computer interfaced receiver at the controlled intersection, to determine the optimum time to switch a traffic light controller, to permit safe passage of an emergency vehicle.

U.S. Pat. No. 6,133,854 to Yee et al. Teaches a local traffic controller interfaced with satellite subscriber unit, to provide centralized control of traffic signals. The communication path may be utilized for accessing information from traffic signal controller.

U.S. Pat. No. 6,326,903 to Gross et al. Discloses a system that allows operators of emergency vehicle to obtain graphic data regarding other emergency vehicle that may pose threats of collision. Automatic signal takes place between emergency vehicles within range of each other to transmit directional data regarding the direction of travel of each emergency vehicle.

U.S. Pat. No. 6,516,273 to Pierowicz et al. which illustrates a method and apparatus for determination potential violation of intersection traffic, by utilizing a vehicle mount GPS based Intersection warning device to Alert the driver, in an event vehicle driver is not responsive to said Intersection traffic control condition system.

U.S. Pat. No. 5,926,114 to Andrews, teaches an intersection warning system, where a vehicle mount radar unit detecting Intersection tags to warn a vehicle driver to the presence of Intersection.

U.S. Pat. No. 5,940,010 to Sasaki et al. describes a vehicle mount intersection warning system, using traffic lane marker magnet for warning the driver of the vehicle, based on results obtained by determination whether the detected running state of said vehicle is appropriate by estimating running state of said vehicle at the boundary position at said intersection. And control unit carrying out a braking control of said vehicle based on the results obtained by the vehicle determination unit.

U.S. Pat. No. 5,635,920 to Pogue et al. describes a remote traffic signal indicator, where transmitters of highly directional energy is installed at traffic lights, while receivers for this radiant energy are installed on each vehicle to warn the driver approaching a traffic signal.

U.S. Pat. No. 6,617,981 B2 to Basinger which illustrates a traffic control method for multiple intersections using street transponders for the detection the presence of vehicles to adjust traffic control lights timing.

U.S. Pat. No. 5,952,941 to Mardirossian which teaches a satellite traffic control and driver ID ticketing system, where a GPS based vehicle speed monitoring device is utilized to detect the speed limit on the road upon which the vehicle is traveling is exceeded. If and when the speed limit is exceeded, a transmitter on the vehicle transmits a signal to at least one satellite indicative of the violation.

U.S. Pat. No. 5,952,941 to Testa describes a speed limit control system involving road monitors and speed limit control in the vehicle which receives signals from road in traffic signs that can automatically lower and restrain vehicle speed.

As illustrated in prior art such as U.S. Pat. No. 6,516,273 to Pierowies et al, U.S. Pat. No. 5,940,010 to Sasaki et al. and U.S. Pat. No. 5,926,114 to Andrews, which teach methods, such in an event a vehicle driver becomes not responsive to intersection traffic control signal condition, the vehicle mount apparatus generates warning signals, for the driver to use vehicle brakes, to slowdown the vehicle to a full stop.

Such teachings found in prior arts cannot necessarily secure avoiding intersection vehicle collision, due to the fact if one presumes the driver whom is not responsive to intersection traffic signal conditions and ignores the warning signals produced by the vehicle mount apparatus and decides not to apply vehicle brake to stop the vehicle at an intersection, where traffic light condition does not permit the driver cross the intersection, and continues to accelerate the vehicle and passes the intersection crossing line, and collides with vehicle(s) crossing the intersection, or hit a pedestrian(s) crossing the intersection, thus causing property damage, bodily injury and possibly death.

Since the vehicle mount apparatus used in prior art teachings which clearly indicates, if a vehicle driver is not in compliance to a traffic signal condition, the vehicle mount apparatus only warns the driver of the vehicle of which the apparatus is installed in, the methods used in prior arts does not describe of sounding vehicle horn, or flash vehicle headlights to warn pedestrian and attract other vehicle drivers attention, accordingly the drivers located near the intersection take necessary measures to avoid a collision. In particularly the apparatuses used in prior art teachings do not contain an RF transmitter, contrary to the present invention wherein each vehicle collision avoidance device contains an RF transmitter which transmits RF warning Alarm signal(s) to other vehicle(s) located at the intersection equipped with a similar vehicle collision avoidance device having an RF receiver circuitry, which upon receipt of the warning transmitted signal(s) warns the vehicle driver(s) to the presence of intersection vehicle collision condition. The present art teaching clearly illustrates an improvement to the art.

It would be obvious to a skilled artisan to recognize that the audio and/or visual alarm signal of Pierowies et al. can be used for warning pedestrians, and if one presume the use of such method and implements such teaching and connect the vehicle horn or vehicle headlights to Pierowies et at vehicle collision avoidance apparatus, and when a vehicle driver fail to response to intersection signal condition, Pierowies et al. teachings warning alarm circuitry immediately will sound the vehicle horn or flash the vehicle headlights, at the same time generates driver warning alarm signals, thus giving no chance for the driver to response to the warning alarm condition before the vehicle makes unnecessary sounds and light flashes. Example, at first initiated driver warning alert signal, the same time vehicle horn will be generating unnecessary and undesirable sound(s) which may cause the driver to receive a city ordinance citation before vehicle driver had a chance to apply vehicle brake to slow down the vehicle. Since Pierowies et al. teaching does not utilize two separately timed warring alarm circuitry, teachings found in Pierowies et al cannot be applied or used as teachings found in the present invention which is designed to have a circuitry to generate first warning alarm signals to warn the driver, and a second alarm circuitry to generate secondary warning alarm such as honk vehicle horn and or flash vehicle headlights which becomes activated after vehicle driver becomes not responsive to the first warning alarm signals, therefore the secondary alarm signals are used only to warn other vehicle drivers and pedestrians located at the intersection, and used for transmitting RF warning alarm signals to other vehicle located at the intersection equipped with collision avoidance devices which upon receipt of the transmitted signals warn the other vehicle driver(s) to take necessary course of action to avoid vehicle collision.

In addition Pierowies et al. and Sasaki et al. teachings additionally describe, if and when a vehicle driver becomes none responsive to a vehicle mount apparatus generated warning signals to slow down the vehicle to stop, the vehicle mount apparatus automatically implies vehicle brake system. Since it is un-known for the vehicle brake control system to know how much brake pressure to apply, or when exactly to apply and when exactly to release the brake mechanism to avoid an intersection collision, thus the use of such automatic brake system may not be safely applied in the art.

For example, a driver pending on traffic condition upon receipt of warning signal may found it is not safe to make a sudden stop to avoid being rear ended, it may require only a little pressure on brake pedal. Or the driver realizes using vehicle brake may not avoid collision with a vehicle located in front, and finds it safer to change lane rather then apply brake. Another example during lane change if automatic brake system is applied the braking may cause a next lane vehicle collide (rear end) with his or her vehicle, or if driver chooses rather then stopping the vehicle decide to make a right turn, and as the vehicle making right turn if vehicle's automatic brake system engages the vehicle may stop on a street corner, this condition may create the possibility of collision with other vehicles crossing the intersection. Further more, a vehicle driver pending on traffic condition may find safer to cross the intersection rather then stop in the middle of intersection by use of such automatic braking system found in prior art teachings, which definitely creates the potential for intersection collision. Conclusively Automatic vehicle brake implementation system found in prior art teachings definitely found to be unsafe method to use in the art.

Although the findings in Jones et al., Yee et al., and Gross et al. and others are useful, but none of prior art teachings indicates where when a vehicle driver ignores received intersection collision condition warning alarm signals from vehicle mount apparatus to slow down to stop, and if vehicle driver becomes not responsive to such alarm warning signals, the vehicle mount collision avoidance device automatically transmits audio/visual secondary warning signals for the pedestrians to take necessary action to avoid being hit by a vehicle, and provide warning to other vehicles located near the intersection to take necessary action to avoid an intersection vehicle accident, and none of prior art teaches provides a vehicle intersection collision avoidance device having an RF transmitter designed to transmit warning alarm signals when a vehicle driver does not slow down the vehicle speed based on received intersection signal condition warning signal(s) wherein the intersection signal condition does not permit vehicles to cross the intersection, the vehicle collision avoidance device then transmits a secondary warning alarm RF signals to other vehicles located near the intersection equipped with collision avoidance devices, which upon receipt of the transmitted signals generates audio/visual or vibrating alarm signals for other vehicle driver(s) to take necessary measures to avoid collision with the vehicle whose driver is not responsive to the traffic signal condition.

The present art teaching clearly indicates the use of two warning circuitry, first alarm for the vehicle driver when being in none compliance with traffic light condition, and a secondary delayed alarm when the driver become none responsive to vehicle collision avoidance device generated warning alarm signals, which then activates the vehicles external horn and or flash vehicle headlight to warn other vehicle drivers and pedestrians located at that intersection, and transmit RF signals to warn other vehicles located at the intersection. The teachings found in the present invention represent definite improvement to the art.

Accordingly, it is the primary objective of the present invention that provides a secure intersection vehicle collision avoidance system, which is designed to warn the vehicle driver and other vehicle driver(s) and pedestrian(s) located at a particular intersection, if and when a vehicle driver becomes not in compliance with intersection traffic signal condition wherein the traffic signal condition does not permit vehicle drivers to cross the intersection, or a stop sign where it requires vehicle drivers to make a full stop before crossing the intersection. It is further objective of present invention that provides other vehicle drivers and pedestrian(s) to take measures to avoid being hit by a vehicle when a vehicle driver is not in compliances with intersection traffic signal condition.

It is still further objective of the Electronic Intersection Vehicle collision Avoidance system of the present invention is capable of notifying monitoring station using a computer (internet or intranet server) which locates whereabouts location of a particular intersection traffic signal violating vehicle(s), and indicating said vehicle ID information, driver ID information, and speed to help law enforcement to locate said vehicle, by the use of said vehicle collision avoidance device GPS receiver containing a wireless modem designed to communicate with monitoring station PC, Patrol vehicle Lap top or a PDA unit.

It is accordingly objective of present invention, wherein a vehicle mount collision avoidance device reads driver biometric or voice recognition, to positively ID driver, and transmits driver traffic signal condition violation information to Department of Motor Vehicle, through the traffic signal mount RF transceiver units which is connected to the land line used to control said traffic signal(s) from a central station PC, and ascertains to positively ID a driver whom is in violation of traffic light conditions, and accordingly generates traffic violation ticket to the driver(s).

The Electronic Intersection vehicle Collision Avoidance System of the present invention must be durable and long lasting nature and it should require little or no maintenance to be provided by the user throughout its operating lifetime. In order to enhance the market appeal of the present invention, its components should also be of relatively inexpensive construction to thereby afford it the broadest possible market. Finally, it is also an objective that all of the aforesaid advantage and objectives of the present invention be achieved without incurring any substantial relative disadvantage.

The present art provides an intersection vehicle collision avoidance system which is affordable, and easy to install, simply by attaching communication transmitters or transceiver devices to traffic signal lights, which is used for transmitting traffic light conditions to vehicle mount apparatus, and may be used for sending driver and traffic violation condition to a monitoring PC, and a vehicle mount collision avoidance device may receive intersection traffic signal condition from orbiting satellites, and such devices already in existing in modern vehicles as GPS navigation devices and satellite radios which with little modification such devises becomes useful in the art. The vehicle intersection collision avoidance device may be incorporated into a hand held GPS navigation or a cellular phone device by some hardware and firmware modification.

SUMMARY OF INVENTION

Intersection vehicle accidents creates human life lose, and high property damage. Intersection Traffic lights most of the time helps to guide proper traffic flow, Intersections with good visibility helps lower the amount of intersection vehicle accident. Good and Alert driver avoid most intersection accident by driving in compliance with traffic signals and driving within speed limit.

However sometime drivers minds are distracted by deep thoughts or busy talking to passenger and sometimes drivers try to race the intersection traffic lights, which is one of the primary causes of intersection accidents.

It is according to the present invention, which is designed to avoid such unnecessary accidents, by use of Electronic Intersection Vehicle Collision Avoidance System. The system comprises of Vehicles mount intersection collision avoidance devices having RF receiver or a transceiver, a vehicle speed compare-tore CPU, a vehicle travel direction detection compass or GPS receiver circuitry, and an audible, visual and or vibrating alarm warning devise. And intersections using traffic signal lights or stop signs, equipped with RF transmitters or transceivers transmitting a uniquely coded signals for each direction traffic signal condition when traffic signal condition does not permit vehicles traveling towards the intersection to pass the intersection, or it requires each of the vehicle driver to make a full stop before passing the intersection.

When an intersection traffic lights turn amber or red; the traffic signal transmitter transmits a unique RF coded signal, if a vehicle approaching towards a particular intersection signal light at a set distance the vehicle collision avoidance device receives the particular travel direction traffic signal transmitted RF signals, and accordingly the vehicle collision avoidance device speed compare-tore CPU compares the vehicle speed being in compliance with the traffic signal condition which does not permit vehicle drivers to cross the intersection, if vehicle driver does not slow down the vehicle speed, the vehicle collision avoidance device accordingly produce a first audio/visual and vibrating alarm to alert the vehicle driver, if the driver does not become responsive to the first warning alarm signals, the vehicle collision avoidance device transmitter transmits a secondary RF alarm signals to other vehicles located at that intersection equipped with intersection collision avoidance device, where the collision avoidance devices upon receipt of said alarm signal(s) generates audio/visual or vibrating alarm to alert the vehicle drivers the presence of a vehicle(s) who's driver is not in compliance with intersection traffic light condition, and vehicle collision avoidance device honks the vehicle horn and flashes the vehicle headlight to warn the pedestrians located at the intersection for pedestrian to take necessary measures to avoid getting hit by the vehicle.

According to the present invention stop signs used at intersections are equipped with similar transmitters with a unique code, when a vehicle equipped with an intersection vehicle collision avoidance device, the device speed comparator CPU upon receipt of RF transmitted signals from a intersection stop sign compares the vehicle speed, if vehicle is in the course of slowing down and makes a full stop, the vehicle intersection collision avoidance device will not initiate warning alarm signal. If vehicle mount intersection collision avoidance device speed comparator CPU at set distance from the stop sign detect no change or detects increase in vehicle speed, the vehicle collision avoidance device will generate audio/visual or vibrating warning alarm signal(s) to the driver for the to slow down the vehicle to stop.

Additionally the vehicle mount intersection collision avoidance device is capable of reading operator RFID tag, smart card, key fob etc. to start the vehicle engine, and for the purpose of identifying the driver ID, and the comparator CPU using an RF transmitter with a unique code to transmit said driver ID information to a traffic light mount RF transceiver which is utilized to receive the transmitted signals. In this case if a driver does not stop at red traffic signal light, the vehicle intersection collision avoidance device transmits a signal containing information to particular vehicle, driver ID along with violation event code. The transmitted signal will then be picked up by the particular intersection transceiver unit, which will relay the information along with traffic signal location information to a monitoring station, the monitoring station equipped with a PC logs the event information with date and time, and produce electronic ticketing.

In a preferred embodiment of the present invention, the vehicle intersection collision avoidance system utilizing a GPS (DGPS) unit which is connected to the vehicle collision avoidance device to monitor vehicle location, vehicle travel direction, vehicle distance from a particular intersection signal, and vehicle speed condition.

When a vehicle mount Intersection collision Avoidance unit receives a particular street intersection traffic signal condition transmitted RF signal (traffic signal turns amber or red) the vehicle collision avoidance device processor compares the received GPS vehicle direction movement signal along with vehicle speed and vehicle traveled direction with said intersection traffic signal location, if vehicle speed is in the course of slowing down in course of making a full stop at an intersection the system operates normal means no initiation of any alarm signals to the driver. If vehicle speed is not indicating a slowing down based on a set distance from the intersection, the vehicle intersection collision avoidance device generates an audiovisual or vibrating alarm signal to alert the driver to slow down and stop the vehicle, if the driver does not comply the vehicle intersection collision avoidance system produces the secondary alarm signals to warn other vehicles and pedestrians to the presence of intersection collision.

In another embodiment of present invention if the driver of a vehicle after receipt of the warning signal to slow down the vehicle to stop at the traffic intersection and ignores the warring alarm signals and pass the intersection, the vehicle mount GPS modem (GSM, Pager, satellite etc.) unit signals a monitoring station server, which receives a signal containing information to the particular motor vehicle information located at a particular intersection location (vehicle longitude/latitude and speed), and logs said information in its database. The monitoring station PC (Law enforcement station) is capable of electronically issuing citations to particular vehicles or to its drivers. (Vehicles equipped with electronic driver authentication devise). Additionally Patrol vehicles may be equipped with on board computers (or palm PC) connected to the monitoring server, used to accommodate patrol officer to pursuit the vehicle and give the driver a citation.

In another preferred embodiment of present invention, the intersection traffic signal RF transmitted signal may not be necessary at all, the present art intersection signal condition generated RF transmitted signals may be of satellite generated signals, used to provide vehicle collision avoidance devices the intersection traffic signal condition information, such received signals by vehicle collision avoidance device may be used by vehicle speed comparator CPU with a compass or with a GPS based collision avoidance system containing in it's data base city maps with intersection location information where traffic signal lights and stop signs are located.

When a vehicle approaches a particular location intersection, the vehicle mount intersection collision avoidance device compares received GPS vehicle location signal with vehicle travel direction and vehicle speed with GPS unit database map particular intersection location information, if vehicle collision avoidance device GPS unit indicates vehicle speed is slowing down for a full stop, the system operates normally. If vehicle collision avoidance device received GPS signal does not indicate slowing down of the vehicle, the vehicle intersection collision avoidance device transmits a warning alarm signal to the driver, if driver does not comply the vehicle collision avoidance device initiates a secondary warning alarm, to warn other vehicle(s) and pedestrians located within the intersection.

BRIEF DESCRIPTION OF THE DRAWING

This and other advantages of the present invention are best understood with reference to the drawings, in which.

DETAILED DESCRIPTION OF THE INVENTION

Figure 1:
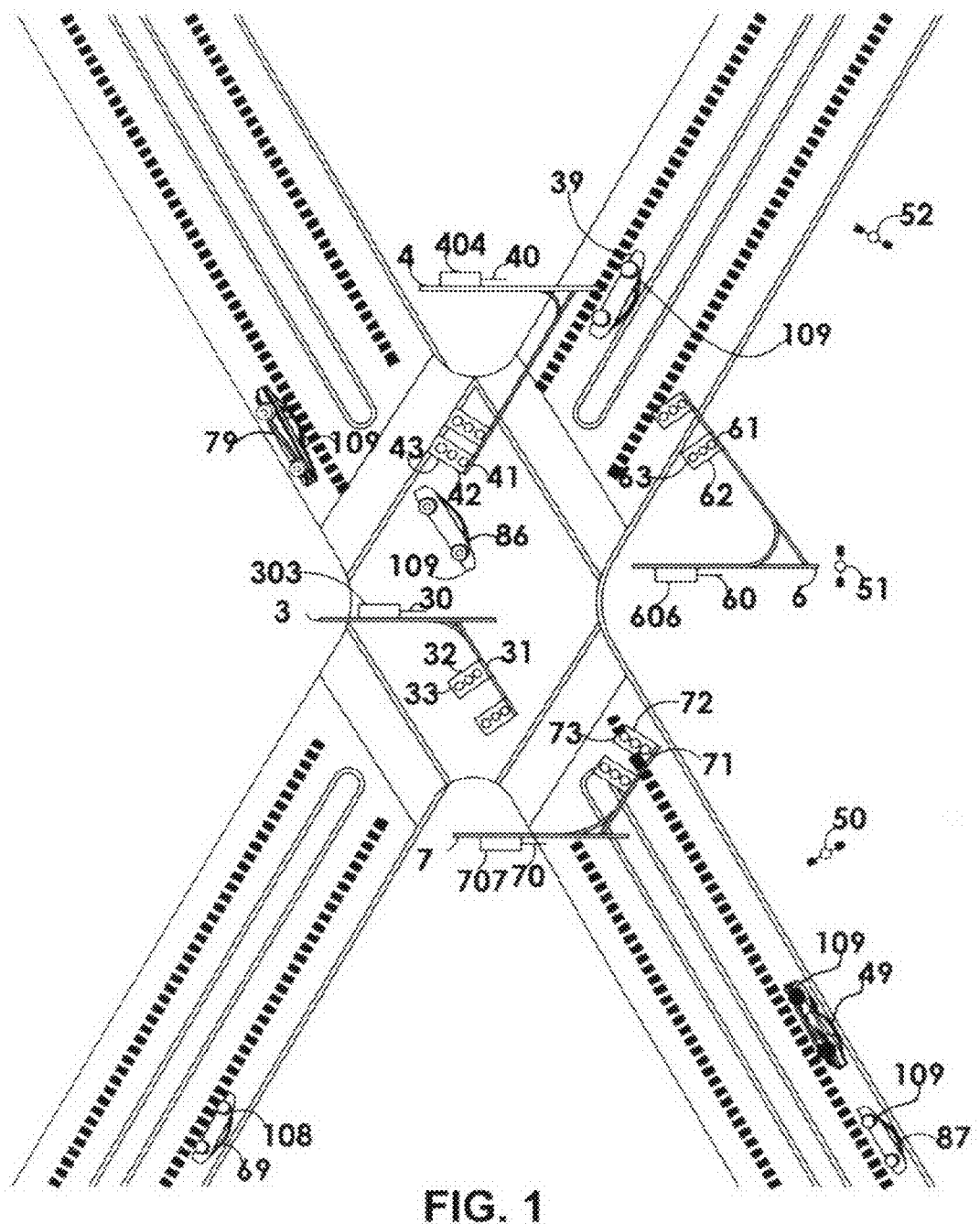
FIG. 1 is a drawing with view of an intersection having four traffic lights each one of said traffic lights is equipped with RF transmitters. And as illustrated in the drawing, plurality of vehicles equipped with electronic collision avoidance device. And in addition showing GPS system integration.

The preferred embodiment of the electronic intersection vehicle collision avoidance system of the present invention is illustrated in as deployed in the exemplary situation of an intersection in FIG. 1. Four traffic light posts, north 3, south 6, east 4, and west 7, are installed on an intersection, each one of said post 3, 6, 4, and 7, are equipped with a traffic light control box 303, 606, 404, and 707, and each one of said traffic control box is connected to corresponding single or multi frequency band RF transmitters or transceivers 30, 60, 40, and 70, and each one of said traffic control box is connected to corresponding traffic signal lights 31, 32, 33, 41, 42, 43, 61, 62, 63, 71, 72, and 73. The traffic control box is designed to control and synchronize the RF transmitter transmitting timing with said traffic light changing condition, and accordingly transmit uniquely coded signal for each of said traffic direction light condition.

A vehicle mount collision avoidance device 108, containing a vehicle speed compare-tore CPU 104, and an RF transceiver 102, and a vehicle travel direction detection circuitry 103, and a first 105 and a second 106 warning alarm circuitry, the vehicle collision avoidance device RF transceiver 102 is design to receive traffic condition signals from said intersection signal transmitters 61,62, the intersection traffic signal transmitter(s) and or transceivers(s) 61,62 at pre-set time interval transmitting unique coded signal containing information to each one of said particular direction traffic 6 signal condition, if a particular direction traffic signal condition 61, 62 does not permit a particular direction traveling vehicle 69 to pass the intersection, at a predetermine distance from the intersection the vehicle 69 collision avoidance device 108 speed comparator CPU 104 receiving uniquely coded traffic direction condition signals 61,62, which is associated with vehicle travel direction 6, the vehicle speed comparator processor 104 compares the received traffic signal condition signal 61,62 with the vehicle 69 speed, if the vehicle 69 speed is not in compliances with the traffic signal condition 61, 62, the vehicle collision avoidance device 108 initiates said first internal warning alarm signal(s) 105 to warn the driver to slow down the vehicle to a stop, if the driver becomes non responsive to the first alarm signal(s) 105, at a predetermined time the vehicle collision avoidance device 108 initiates secondary external alarm signal 102, 106 by transmitting RF warning signal(s) 102 to other vehicle(s) 39, 49, 79, 87 and 96, located within or within the boundaries of the intersection, the other vehicle(s) 39, 49, 79, 87 and 96 collision avoidance devices 109 upon receipt of transmitted signal(s) 102, generate a warning alarm signal(s) 105 to alert the driver(s) to take necessary measures to avoid intersection collision with the vehicle 69 whose driver is not in compliance with the intersection signal condition 61,62.

When north bound and south bound traffic light control box 303, 606 turns said traffic lights green 33, 63, the traffic light's transmitters will not transmit RF signals, vehicle 69, traveling southbound, and vehicle 39 traveling north bound traffic direction, the vehicles 69, and 39 equipped with vehicle collision avoidance device 108,109 approaching the intersection, the vehicle's 39, and 69 on board collision avoidance devices 108, 109 receiver will not receive RF signals from intersection signal post transmitters 30, 60 the vehicles onboard collision avoidance device will not initiate warring signals to the operator's of the vehicles 69, and 39, and the vehicles 69, and 39 safely can cross the intersection.

As illustrated in FIG. 1 where as vehicle(s) 39, 69, 79, 87, 96, equipped with intersection collision avoidance devices 108,109 having vehicle speed compare-tore CPU to read vehicle speed and it is equipped with an electronic compass 103 to detect vehicle travel direction movement. The when vehicle(s) 49, 79, 87, 96 mount speed compare-tore CPU receive vehicle(s) travel direction intersection light 42,72, (amber) and 41, 71 (Red) coded RF signal, the vehicle(s) 49,79,87,96 speed comparator CPU compares said received uniquely coded traffic signal 42,72,41,71 the vehicle(s) 49,79,87,96 mount collision avoidance device electronic compass 103 compares vehicle travel direction detected signal with said intersection signal position 4,7, if the intersection light control box 404,707 RF transmitted signal 40,70 traffic direction code match the with the vehicle mount electronic compass 103 detected vehicle travel direction code, then each vehicle 49,79,87,96 collision avoidance device 108 processor compares vehicle(s) speed to determine vehicle(s) 49,79,86,87 driver(s) are slowing down to stop the vehicle(s) 49,79,86,87 at the intersection. Wile vehicles 39, 69 receiving RF signal from intersection signal RF transmitters 40, 70 due to the fact the transmitted traffic signal direction code is not of a match with the vehicle(s) 39,69 travel direction, thus vehicles 39,69 collision avoidance device 108 will not initiating any warning alarm 105 to the driver(s) of said vehicle(s) wherein drivers have no need to slowing down the vehicle(s)

39,69 to stop since said direction traffic signal light 33,63 are Green, and the vehicles 39,69 are safely crossing the intersection.

In a preferred embodiment of the present invention, FIG. 1 the vehicles 39,49,69,79,96 are equipped with GPS or DGPS receivers, which is incorporated with the vehicle(s) 39,49,69, 79,96 collision avoidance device 108,109. When vehicles 49,79 equipped with GPS based collision avoidance device receives uniquely coded RF signal from intersection traffic control box 40,70 red signal light 41,71, the vehicle(s) 49, 79 collision avoidance processor 108 compares the particular intersection traffic light transmitters 40, 70 uniquely coded received signal, with GPS satellite 50,51,52 received signal, if signal light control box transmitted 40,70 RF coded signal and the vehicle 49,79 GPS receiver received vehicle 49,79 travel direction signal is a match, the vehicle(s) 49,79 collision avoidance processor 108 compares the vehicle(s) 49,79 travel direction, speed base on received GPS satellite 50,51, 52 signals, if any one of the vehicle 49,79 driver becomes not in compliances to slow down to stop the vehicle at the intersection, the particular vehicle 49 or 79 collision avoidance device will initiate audio-visual or vibrating alarm 105 to warn the driver to slow down, if the driver becomes not responsive to warning alarms 105, the vehicle collision avoidance device 108 transmits a secondary alarm condition signals 106 by honking vehicle horn, flash vehicle headlight to war pedestrians and other vehicle drivers located at the intersection, and transmit RF signals through the vehicle collision avoidance device RF transmitter 102 which is received by other vehicles collision avoidance devices 109 which then warns other vehicle drivers located at that particular intersection.

In a preferred embodiment of the present invention said vehicle(s) 49,79 collision avoidance device additionally is equipped with a wireless modem, (UHF, Cellular, and Satellite) 100. If vehicle(s) 49,79 driver passes an intersection when traffic signal lights 41,71 does not permit, the vehicle wireless modem or satellite unit transmits vehicle(s) 49,79 and driver information along with vehicle(s) 49,79 GPS position to a monitoring station 101, which is connected to an intranet or internet, used for receiving vehicle(s) 49,79 and driver information along with vehicle(s) 49,79 position location and designed to provide information to patrol vehicles, to facilitate officers to intercept the vehicle in violation.

Figure 2:
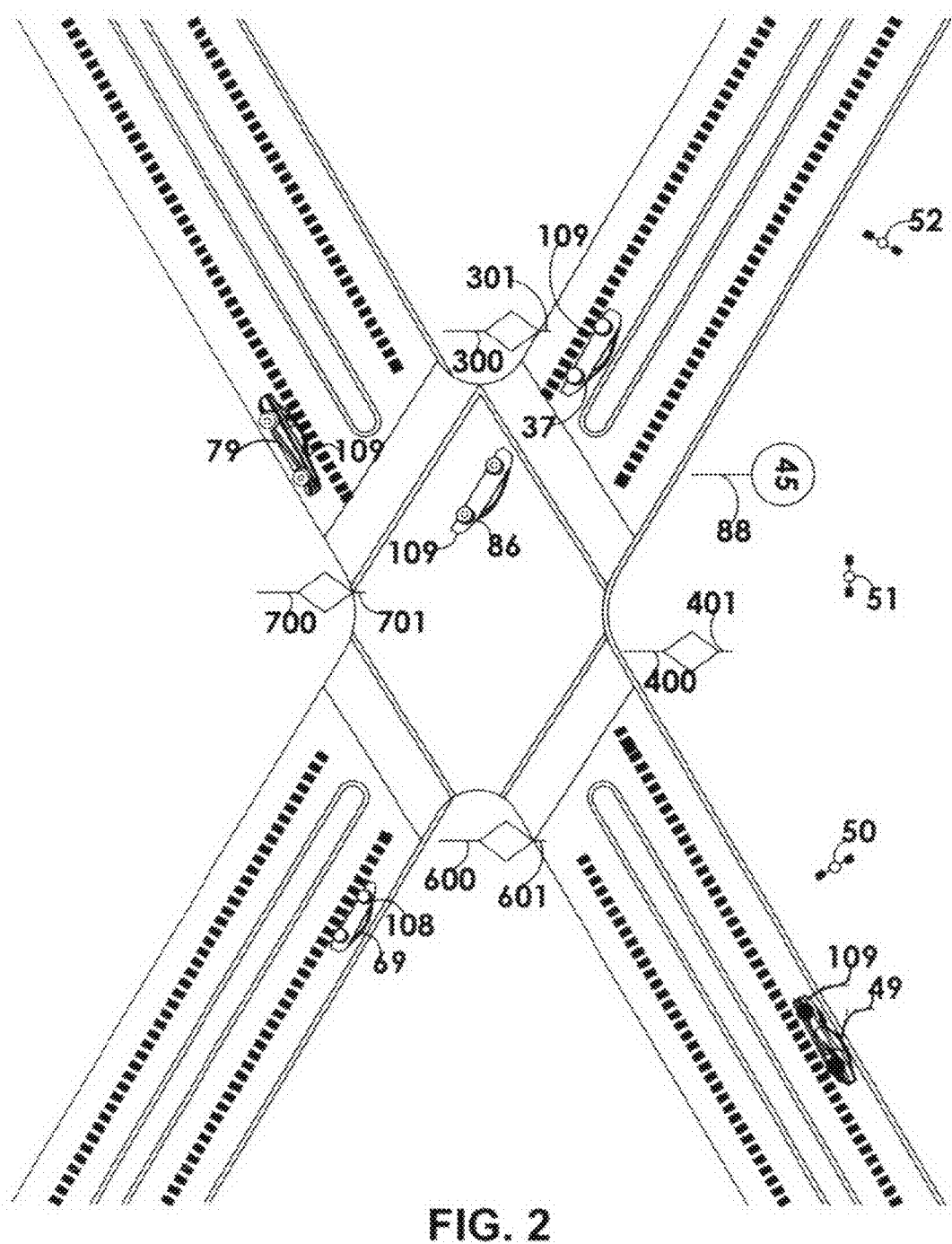
FIG. 2 is a drawing with view of an intersection having four traffic stop signs, each one equipped with an RF transmitter or a transceiver unit. As illustrated in the drawing, plurality of vehicles equipped with Electronic vehicle collision avoidance device. And in addition showing GPS system interrogation.
Figure 3:
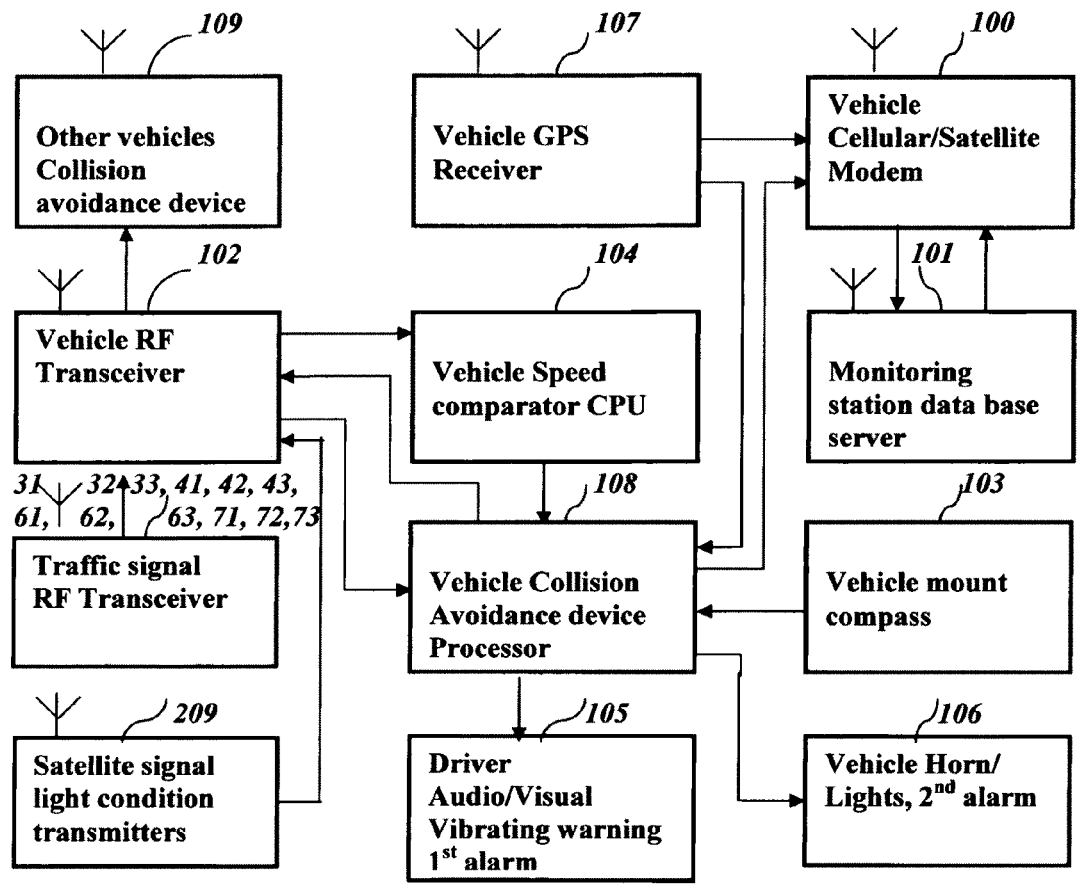
FIG. 3 Is a Drawing of functional block diagram of the Electronic Vehicle Intersection Collision Avoidance System.

In a further embodiment of the present invention, wherein FIG. 2 street or highway intersection posted stop sing 300, 400,600,700 locations could be downloaded in each one of vehicles 37,49,69,79 GPS based collision avoidance device mapping database 107,108, when a vehicle(s) 37,49,69,79 arrives at a particular intersection and a particular driver does not slow down at a set distance to make a full stop, the vehicle(s) 37,49,69,79 GPS based collision avoidance device 107,108 processor compares the each vehicle 37,49,69,79 location and travel speed based on received GPS signals 50,51,52, if vehicle(s) 37,49,69,79 driver(s) slowing down to stop the vehicle(s) the particular vehicle collision avoidance device 108 will not generate warning alarm signals 105. If any one of the vehicle 37,49,69,79 driver becomes not in compliance to slow down the vehicle to stop, the particular vehicle(s) 37,49,69,79 GPS based cellular or satellite modem 100 transmits vehicle(s) 37,49,69,79 violation information along with driver and vehicle ID and vehicle location information to a monitoring station 101.

In preferable aspect of invention, the vehicle collision avoidance device may not necessarily to receive RF transmitted signals from intersection traffic signal light control transmitter units FIG. 1—30,40,60,70. The vehicle collision avoidance device 108 of the present invention is capable of receiving the unique coded intersection signal condition generated signal(s) directly from orbiting satellites 209.

And further the transmitters used in intersection traffic lights may be utilized in traffic stop singes FIG. 2, 401 without having traffic lights, in this aspect when a vehicle arrives at intersection being equipped with stop singe(s) 300,400, 600,700 contains RF transmitter or transceiver 301,401,601, 701 the intersection stop sign mount transmitter(s) each transmits a unique coded signal, and when a vehicle(s) 37,49,69,79 equipped with a vehicle collision avoidance device 108 approaches the intersection at a set distance, the vehicle(s) 37,49,69,79 the collision avoidance device 108 upon receipt of a uniquely code RF signal from particular travel direction stop sign transmitter 401 the vehicle speed comparator compares vehicle speed, if the vehicle(s) 37,49,69,79 slowing down to stop, then the vehicle(s) 37,49,69,79 collision avoidance device does not transmit warning alarm signals. If vehicle driver is not in compliance and does not slow down a particular vehicle 37,49,69,79 the particular vehicle collision avoidance device 108 generates audio/visual and vibrating warning alarm signal 105 for the driver to slow down the vehicle to stop at the intersection, if the driver ignores the warning alarm signals 105, the vehicle collision avoidance device will generate a secondary warning alarm 106, 109 to warn pedestrians and other vehicle drivers located at that particular intersection.

What is claimed is:
1. A system for avoiding intersection vehicle collision, said system comprises of;
    a intersection traffic signal(s) condition transmitter(s), or transceiver(s),
    a vehicle mount or portable collision avoidance device, containing
    a vehicle speed compare-tore CPU, and
    an RF transceiver, and
    a vehicle travel direction detection circuitry, and
    a first and a second warning alarm circuitry,
    said vehicle collision avoidance device RF transceiver is design to receive traffic condition signals, and transmit RF warning alarm signal(s) to other vehicle(s), equipped with a collision avoidance device,
    said intersection traffic signal transmitter(s) and or transceivers(s) at pre-set time interval transmitting unique coded signal containing information to each one of said particular direction traffic signal condition, if a particular direction traffic signal condition does not permit said particular direction traveling vehicle(s) to pass the intersection, at a predetermine distance from said intersection said vehicle(s) collision avoidance device speed comparator CPU receiving said uniquely coded traffic signal condition signal which is associated with said vehicle travel direction, said vehicle speed comparator processor compares said received traffic signal condition signal with said vehicle speed, if said vehicle speed is not in compliances with said traffic signal condition, said vehicle collision avoidance device initiates said first internal warning alarm signal(s) to warn the driver to slow down the vehicle to stop at said intersection, if the driver becomes non responsive to said first alarm signal(s), at a predetermined time said vehicle collision avoidance device initiates said secondary external alarm signal by transmitting RF warning signal(s) to said other vehicle(s) located within or within the boundaries of said intersection, said other vehicle(s) collision avoidance device upon receipt of said transmitted signal(s)

generates a warning alarm signal(s) to alert the driver to take necessary measures to avoid intersection collision with said vehicle.

2. The system according to claim 1 wherein said vehicle collision avoidance device second alarm signal additionally comprises of a honking horn and or vehicle light(s), used to generate audio and or
visual alarm signals to warn pedestrians and or other vehicle driver(s) to the presence of an intersection collision condition.

3. The system according to claim 1 wherein said vehicle Collision avoidance device additionally is equipped with a GPS receiver for providing vehicle location, vehicle travel direction, vehicle speed, vehicle distance from intersection location information to said vehicle collision avoidance device processor, based on received traffic condition transmitted signal and received GPS signals, said processor compares said vehicle location, said vehicle travel direction, said vehicle speed condition, with said traffic intersection signal location(s) and accordingly determines said vehicle speed is not in compliance with said traffic signal condition, and generates said first and secondary warning alarm signals.

4. The system defined in claim 1 wherein said traffic intersection signal condition is controlled by orbiting satellites transmitted signals, said transmitted signals received by said vehicle mount collision avoidance device receiver, said transmitted signals containing particular intersection(s) traffic signal condition status used by said collision avoidance CPU to compare said vehicle speed with said particular intersection location distance, and accordingly generate said first and second warning alarm signals.

5. A system for avoiding intersection vehicle collision system,
wherein said system comprises;
a plurality of intersection signal(s) having RF transmitters, designed to transmit a uniquely coded signal in response to said intersection signal condition, containing information to each one of said particular direction traffic signal condition,
a plurality of vehicles containing a vehicle collision avoidance device having an RF transceiver designed to received said RF transmitted signal, and transmit RF signals to establish communication with other vehicles located at said intersection, said vehicle collision avoidance device additionally contains
a GPS receiver
a processor and
a first and second warning alarm generating circuitry,
said GPS receiver database containing location information of plurality of intersection having traffic signals,
a vehicle traveling in direction towards a particular intersection, said intersection location information is within said vehicle GPS unit map database,
if intersection traffic signal light condition does not permit said particular direction traveling vehicle to pass said intersection, at a preset vehicle location distance from said intersection said RF transceiver receives said intersection traffic signal condition transmitted signals, and said vehicle collision avoidance device processor compares said intersection location information with said vehicle GPS location, and with said vehicle speed and travel direction, accordingly calculates said vehicle speed with said vehicle distance from said traffic signal location, and determines if vehicle speed is not in compliance based on said vehicle location and given intersection traffic signal location, said vehicle collision avoidance apparatus initiates said first warning collision alarm signal(s) to warn the driver, if the driver becomes none responsive to slow down the vehicle to stop the vehicle, at a predetermined time said vehicle collision avoidance device generates a secondary RF warning alarm communication link with other vehicle(s) equipped with a collision avoidance device located at that particular intersection, which upon receipt of said secondary transmitted signal generates a warning alarm signal(s) to warn the vehicle driver(s) to take necessary action to avoid intersection vehicle collision.

6. The system defined in claim 5 wherein said traffic intersection signal condition is controlled by orbiting satellites transmitted signals, said transmitted signals received by said vehicle mount collision avoidance device receiver, said transmitted signals containing particular intersection(s) traffic signal condition status used by said collision avoidance CPU to compare said vehicle speed with said particular intersection location distance, and accordingly generate said first and second warning alarm signals.

7. The system according to claim 5 wherein said vehicle collision avoidance device second alarm signal additionally comprises of a honking horn and or vehicle light(s), used to generate audio and or visual alarm signals to warn pedestrians and or other vehicle driver(s) to the presence of an intersection collision condition.

* * * * *